United States Patent [19]

Pozniak

[11] 4,136,615
[45] Jan. 30, 1979

[54] PATTERN PLATE OF COMPOSITE STRUCTURE

[75] Inventor: Norman J. Pozniak, Midland, Mich.

[73] Assignee: The Dow Chemical Company, Midland, Mich.

[21] Appl. No.: 835,929

[22] Filed: Sep. 23, 1977

Related U.S. Application Data

[63] Continuation-in-part of Ser. No. 652,601, Jan. 26, 1976, abandoned.

[51] Int. Cl.² .......................... B41N 1/06; B41C 1/02
[52] U.S. Cl. ................................ 101/401.1; 101/395; 101/458; 428/215; 428/461; 428/483
[58] Field of Search .................. 101/401.1, 395, 453, 101/458, 459; 428/215, 461, 483

[56] References Cited

U.S. PATENT DOCUMENTS

| | | | |
|---|---|---|---|
| 2,258,520 | 10/1941 | Somers | 101/401.1 |
| 2,800,856 | 7/1957 | Myers | 101/401.1 |
| 3,015,268 | 1/1962 | Garrett | 101/401.1 |
| 3,289,578 | 12/1966 | Grosso | 101/458 |
| 3,319,564 | 5/1967 | Goffredo | 101/401.1 |
| 3,351,009 | 11/1967 | Plank | 101/401.1 |
| 3,361,063 | 1/1968 | Thorpe et al. | 101/401.1 |
| 3,447,460 | 6/1969 | Vincent et al. | 101/395 |
| 3,563,008 | 10/1970 | Ritzerfeld | 101/401.1 |
| 3,615,442 | 10/1971 | Geris et al. | 101/459 |
| 3,658,635 | 4/1972 | Eustice | 428/461 |
| 3,835,780 | 9/1974 | Gracia et al. | 101/458 |
| 3,865,595 | 2/1975 | Watkinson | 101/459 |

*Primary Examiner*—Clyde I. Coughenour
*Attorney, Agent, or Firm*—Lester J. Dankert

[57] ABSTRACT

A pattern plate for use in printing has an etched sheet of magnesium laminated to a self-supporting, dimensionally stable, all-plastic base structure of adhesive ethylene/carboxylic acid copolymer layer and poly(ethylene terephthalate) sheet. The magnesium sheet is preferably of minimal thickness corresponding to the maximum depth of etch, e.g. 30 mils, and is bonded to the adhesive ethylene/carboxylic acid copolymer layer, e.g. ethylene/acrylic acid copolymer layer, which is bonded to the poly(ethylene terephthalate) sheet.

1 Claim, 3 Drawing Figures

PATTERN PLATE OF COMPOSITE STRUCTURE

CROSS-REFERENCE

This application is a continuation-in-part of copending application, Ser. No. 652,601 filed Jan. 26, 1976, now abandoned.

BACKGROUND OF THE INVENTION

This invention relates to pattern plates for printing, especially to such plates made by photoengraving wherein a metal plate is coated with a photoresist layer and exposed to light through a negative, after which the unexposed portion of the photoresist layer is removed and the metal is etched away, leaving the exposed resist-coated portions of the metal plate standing in relief. The metals are commonly magnesium, zinc and their alloys, and the etchant comprises aqueous nitric acid. In the early art, the tendency of the acid to undercut the resist during the etching step was combatted by "powdering" the plates after a shallow etch and repeating the operations until the desired depth was obtained.

Modern "powderless" etching was introduced by John A. Easley and Harry E. Swayze in U.S. Pat. Nos. 2,640,763 to 2,640,767, inclusive, (1953) and further improved subsequently, e.g. in U.S. Pat. Nos. 2,763,536; 2,828,194; 2,940,836; 2,979,387; 3,023,138; 3,152,083; 3,239,466; 3,251,777; 3,320,171; 3,330,765; 3,337,462; 3,357,921; 3,490,968; 3,510,372; 3,725,158; 3,725,159; 3,728,180; 3,730,899; 3,736,197; and 3,922,229 and others relating to the formulation of etchant compositions for improved etching of metal photoengraving plates.

For use of pattern plates in printing, especially for the purpose of making therefrom a stereotype pulp mat and thence casting a stereotype metal plate for letterpress printing, the pattern plates are preferably etched to a depth of about 30 mils (0.030 inch) in the larger "open" areas between print lines, i.e. in the "white" areas between the inked lines of the print. Accordingly, it has become commonplace to use stock engraving metal sheets that are about 40 mils thick in order to avoid risk of etching through the plate.

With the increasing costs of metal and the increased concern for waste disposal and conservation of material resources, it would be desirable to reduce the thickness of etchable metal in pattern plates for use in printing arts.

However, the fundamental requirements of a pattern plate include structural integrity and dimensional stability. The usual structure of a pattern plate is characterized by a multiplicity of areas, often individually tiny areas, of the sheet corresponding to the relief printing surfaces or image areas of the pattern plate, between which are the etched-out areas corresponding to the non-printing or non-image areas of the pattern plate. It is essential that the treatment and process to form the pattern plate not cause holes therethrough and not cause weakening that could result in loss of part of the printing portion of the pattern plate. It is also essential that the pattern plate be dimensionally stable so that the printing or image areas of the plate are held in fixed relationship despite the presence of relatively thin areas in the non-printing, non-imaged portions of the pattern plate and the use of very heavy pressures in the step of making mats from such pattern plates.

The present invention provides pattern plates having structural integrity and dimensional stability wherein the metal portion consists entirely of etched magnesium of minimal thickness usually corresponding to the maximum depth of the etch.

SUMMARY OF THE INVENTION

The pattern plates of this invention are multilayered composite structures having a sheet of magnesium, of minimal thickness usually corresponding to the maximum depth of etch, bonded to a self-supporting, dimensionally stable, non-metallic, all-plastic base structure, in which the magnesium sheet is bonded to an intermediate layer of adhesive ethylene/carboxylic acid copolymer which in turn is bonded to a backing sheet of poly(ethylene terephthalate). In a preferred embodiment, the magnesium portion is approximately 30 mils thick, bonded to an ethylene/acrylic acid copolymer film approximately 2 mils thick which is in turn bonded to a sheet of poly(ethylene terephthalate) approximately 3 mils thick. The plates are lighter in weight than all-metal pattern plates of like dimensions, are entirely safe from burn-through forming holes in the plate during acid etching, have structural integrity with no weakening of plate or loss of image portions, and are dimensionally stable; while they are flexible, they do not readily kink, buckle, stretch or break. Moreover, the etched pattern plates directly from conventional acid etching process are unexpectedly clean, i.e. free of unwanted metal in the non-imaged areas of the plates, and require less hand work to prepare them for use as pattern plates in printing.

DESCRIPTION OF THE DRAWING

The drawing figures are schematic sketches, in section, of certain embodiments of multi-layered laminated pattern plates according to this invention. The sketches are for illustration and are not necessarily to scale.

DETAILED DESCRIPTION AND EMBODIMENT

Figure 1:
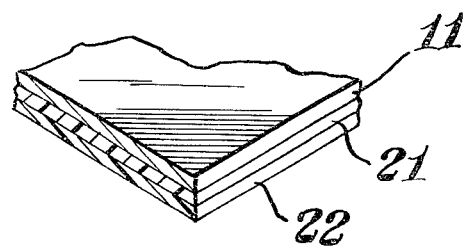
FIG. 1 illustrates a three layer structure.

The etchable metal sheet component of the present multilayered pattern plate is composed of magnesium, zinc and their photoengravable alloys. Magnesium is usually preferred for ecological reasons because the safe disposal of spent etchant bath waste material containing magnesium is relatively easier than that of material containing zinc.

The metal sheet is selected from grades and quality known to be suitable for photoengraving to pattern plates. A preferred material, called PE alloy sheet, is an alloy of magnesium with nominal composition of 3% aluminum and 1% zinc, by weight. The thickness of the metal sheet is preferably of minimal dimension corresponding to the maximum depth of etch thereof in the pattern plate, e.g. approximately 30 mils. Its surfaces are suitably prepared in conventional manner to remove any mill scale and contamination, e.g., by wire brushing or abrasive grinding or by acid pickling and washing, to render the metal receptive to conventional photoresist coating materials. Such metal, e.g. magnesium, sheet is represented by layer 11 in the drawing figures.

The adhesive ethylene/carboxylic acid copolymer is selected from copolymers of ethylene with ethylenic carboxylic acids such as acrylic acid, methacrylic acid, maleic acid or their ionomeric partial salts, especially such copolymers having from about 2 to about 25 weight percent of such acids copolymerized therein. The acid copolymers, methods for making such acid copolymers, and methods for making films thereof are known per se. The acid copolymer is advantageously used in the form of a thin film or sheet of substantially uniform thickness, usually at least about 0.5 mil thick. In a preferred embodiment, the adhesive copolymer is a copolymer of ethylene and approximately 8 weight percent acrylic acid, in the form of film approximately 1 to 2 mils thick. Such adhesive copolymer film is represented by layer 21 in the drawing figures.

The poly(ethylene terephthalate) is a commercial material known under several brand names, and is preferably used in the form of film or sheet, e.g. as supplied under trademark "Mylar", of substantially uniform thickness, e.g. at least about 2 mils, which provides the requisite stiffness and dimensional stability as backing for the pattern plate. In preferred embodiments, the poly(ethylene terephthalate) sheet has a thickness in the range from approximately 3 to approximately 5 mils. Such sheet is represented by layer 22 in the drawing figures.

The laminated composite structures of the metal sheet, the intermediate layer of adhesive ethylene/acid copolymer, and backing sheet of poly(ethylene terephthalate) are made from the defined starting materials by lamination and coating procedures known per se, e.g. by applying heat and pressure to a stacked assembly of these materials between platens of a press.

In a preferred embodiment, the laminated composite structures are made by continuous lamination process wherein the metal sheet, a web of adhesive copolymer film, and a web of poly(ethylene terephthalate) film or sheet are fed in superimposed assembly through the nip of laminating pressure rolls. In one mode, the rolls are internally heated to heat the laminate and thereby activate the copolymer adhesive and by application of pressure to cause the structure to become bonded together. In another and preferred mode, the starting metal sheet is pre-heated as in an oven to temperature, e.g. 300°–350° F., sufficient to supply the heat necessary to bond the assembly together in the nip of pressure rolls without using heated rolls. To improve the bond therebetween, at least one and preferably both of the surfaces of the ethylene/acid copolymer film and the poly(ethylene terephthalate) sheet facing each other are advantageously pre-treated in conventional manner by electrostatic corona discharge or equivalent surface treatment. The resulting laminated structure is then cut into pieces appropriately sized for use as pattern plates. For convenience, flat pieces of the metal sheet of appropriate size for pattern plates or a multiple of such size are successively fed into the laminating roll apparatus with continuous webs of the adhesive copolymer film and poly(ethylene terephthalate); after lamination, the plastic webs are cut between the adjacent metal pieces to provide separate flat pieces of the resulting laminate.

Alternatively, the adhesive copolymer film can first be laminated either to the metal sheet or to the poly(ethylene terephthalate) sheet, and the resulting two-layer laminate is bonded to the third sheet in a second laminating step. In yet other variations, the adhesvie copolymer can be applied to one or the other or both of the metal or poly(ethylene terephthalate) sheets as a thin layer by melt extrusion or other coating process and the so-coated sheet laminated to the other sheet. In like manner, the adhesive copolymer can be melt extruded as a thin molten film into the nip between the metal sheet and a web of poly(ethylene terephthalate) passing through laminating rolls. Other means of making the laminated structures will occur to the skilled artisan.

Pattern plates are prepared from the laminated structures just described by photoengraving in conventional fashion. The exposed metal surface of the plate is first given a coating of conventional photocurable acid-resistant resist material. In accordance with known art, the metal surface is advantageously pretreated with an aqueous surface treating composition, prior to application of the photoresist coating, to promote greater adherence of the photoresist coating to the metal surface; suitable surface conversion treating compositions for magnesium sheet are described in U.S. Pat. Nos. 3,784,417 and 3,852,125. Such surface conversion treating compositions can be generally described as acidic aqueous solutions principally containing ammonium, phosphate and calcium ions with other ions ($Cl^-$, $NO_3^-$ or $SO_4^-$). The treated magnesium surface can be generally described as having a phosphate conversion layer. Any of the known photoresist materials can be used and applied in conventional manner. Typical photoresists are commercially available formulations of poly(vinyl cinnamate) applied from lacquer-like dispersion in volatile solvent by rolling or brushing on the metal sheet surface followed by drying in the absence of light. In use, the photoresist surface is appropriately masked, e.g. with a photographic negative, and exposed to light in areas corresponding to the image to be printed, thereby curing the photoresist material in the exposed areas. Subsequently, the plate is "developed" by washing it with solvent for the uncured photoresist material, which dissolves the non-exposed coating, leaving the photocured resist coating layer in the light-exposed areas of the metal plate. Suitable solvents include trichloroethylene, which is used hot in a suitably enclosed machine, and mixtures of methylene chloride and perchloroethylene, which can be used at room temperature.

The resulting exposed and "developed" plate is acid-etched in conventional manner, preferably by powderless acid etching, using usual etchant compositions, etching procedures and etching machines known in the art. For magnesium-coating plates, particularly suitable bath formulations, procedures and apparatus are described in U.S. Pat. No. 3,992,229.

The novel laminated structures and pattern plates of this invention are better understood by reference to the drawing figures, in which similar parts have the same numbers.

FIG. 1 represents the novel laminated plate prior to applying the photoresist coating, in which etchable metal sheet 11, e.g. PE magnesium alloy sheet, is bonded to intermediate layer 21 of adhesive ethylene/carboxylic acid copolymer which in turn is bonded to the base or backing sheet 22 of poly(ethylene terephthalate).

Figure 2A:
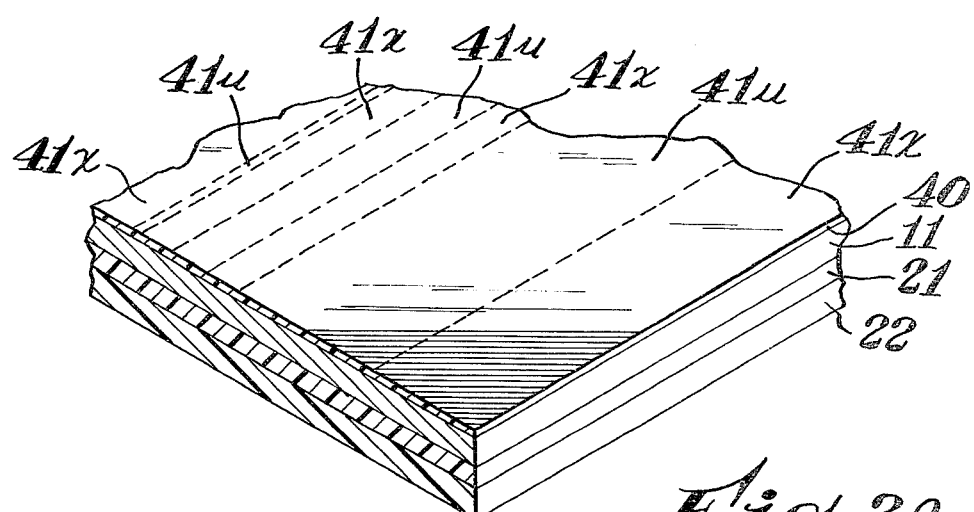
FIG. 2A illustrates a plate coated with photosensitive resist coating and partially exposed to curing radiation.

FIG. 2A represents the laminate plate of FIG. 1 to which has been applied a photoresist coating layer 40, e.g. comprising poly(vinyl cinnamate). FIG. 2A also represents such photoresist-coated plate after exposure to light through a mask having opaque bands such that areas 41x were exposed to light while areas 41u were shielded and not exposed. When, subsequently, the plate is washed with solvent, e.g. hot trichloroethylene, the solvent dissolves and removes the unexposed (uncured)

portions of resist coating 40, e.g. from areas 41u, leaving the photocured resist coating layer 40 in the light-exposed areas 41x.

Figure 2B:
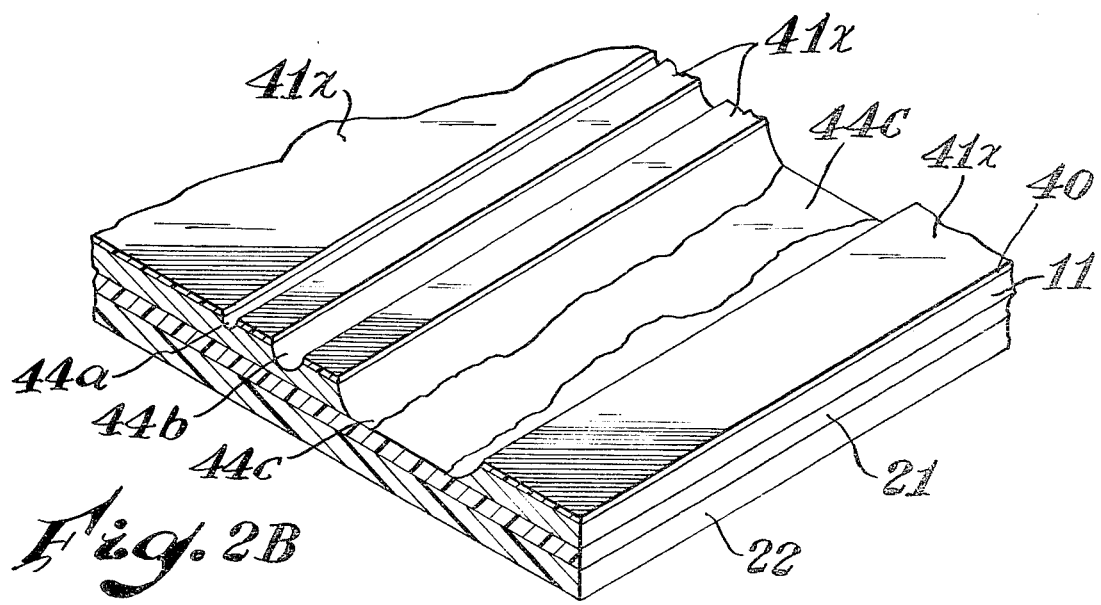
FIG. 2B illustrates the plate of 2A after development and etching.

FIG. 2B illustrates the plate of FIG. 2A after powderless acid etching. The etchant attacks the exposed metal surface of layer 11, removing metal as shown at 44a, 44b, and 44c, leaving unaffected the resist-protected areas 41x in accord with the well-known art of photoengraving. In general, narrow or small areas becomes etched to a relatively more shallow depth as represented by 44a while relatively wider areas become etched more deeply as shown at 44b and 44c. Larger areas may become etched completely through the metal sheet 11 as shown at 44c. However, the resulting pattern plate of this invention retains its structural integrity because of the self-supporting dimensionally stable character of the all-plastic base structure provided by layers 21 and 22. Moreover, the various resist-coated parts 41x of the metal sheet, being firmly attached to the ethylene/carboxylic acid layer 11 of the all-plastic base structure, are securely held in their relative positions in the plate shown in FIG. 2B, even though such parts may be isolated from each other.

After etching, washing and drying, the etched photoengraved pattern plates are used in conventional manner in the printing arts. While they may be used directly for printing therefrom, e.g. in letterpress printing, they are most advantageously used as pattern plates, e.g. for preparation of stereotype mats and thence cast metal stereotype plates. For such purposes, the new pattern plates are processed and used in substantially the same manner as prior all-metal or composite photoengraving plates but with several unexpected results and advantages. The new plates are lighter in weight than prior art metal pattern plates of comparable dimensions while retaining the advantages of etchable metal plates. They are also most economical of etchable metal, using only the minimum thickness thereof required to give the necessary depth of etch and degree of relief in the pattern plate. Surprisingly, during the acid etching step of preparing the pattern plate, the etchant thoroughly removes the metal in the larger areas of maximum depth of etch. This result substantially eliminates the need to mechanically rout out and clean up these non-image (non-printing) areas of the etched plate to remove superfluous metal not cleanly removed by etching, a practice usually performed and requiring specially skilled workers. In the present plates, etching cleanly removes the metal in such areas, and little or no subsequent hand work is necessary, yet it is accomplished without risk of "burning through" and ruining the plate. Moreover, the etched pattern plate has excellent dimensional stability combined with flexibility and does not kink, crack, buckle or stretch, even when bent, but readily returns to flat condition. It also retains its dimensions when subjected to the great pressures applied when forming stereotype mats therefrom.

The following examples illustrate the invention but are not to be taken as limiting the same.

EXAMPLE 1

A 30-mil sheet of photoengraver's etchable magnesium (PE alloy sheet) was laminated to a backing support structure comprising a 2-mil film of adhesive copolymer of ethylene and about 8 w% acrylic acid adhered to a 5-mil thick sheet of poly(ethylene terephthalate). The starting magnesium sheet was first "pickled" in dilute acid to clean and condition its surfaces. The pickling acid was an aqueous solution of about 10–15 weight percent glycolic acid and about 1–5 weight percent of 42° Baume nitric acid. The pickled plate was washed with water and dried and was laminated by heat and pressure to the ethylene/acrylic acid copolymer side of the support structure, whereby the exposed back surface of the laminated plate was comprised of poly(ethylene terephthalate). The exposed surface of the magnesium sheet was then coated in conventional manner with poly(vinyl cinnamate) photoresist coating composition.

In a test of the plate, it was exposed to light through a negative having opaque non-image areas, developed by washing with hot trichloroethylene, and etched in conventional fashion of powderless etching in a nitric acid bath.

The powderless etching bath was composed of 20 volume percent 42° Baume nitric acid, 4.5 volume percent powderless etching additive, and balance water. The powderless etching additive was a storable concentrate composed of the following constituents in parts by weight:

| | |
|---|---|
| Trisodium phosphate, dodecahydrate | 2.5 |
| Malic acid | 2.81 |
| Diethylene glycol n-butyl ether | 18.75 |
| Isostearic acid | 18.75 |
| Sulfated fatty acid ester[1] [2] | 4.25 |
| Dodecylbenzene sulfonate[2] | 4.64 |
| Short chain fatty acids[3] | 2.5 |
| Caustic soda[2] to neutralize to pH 8 | 7.25 |
| Water, balance to total 100. | |

Notes:
[1] Calsolene Oil HSA brand of Sulfated Fatty Acid Ester as described and defined in USP 3,922,229.
[2] 50 w % active ingredient in water; parts of solution.
[3] Emery 658 brand blend of 56 w % caprylic acid, 40 w% capric acid, 2 w % caproic acid and 2 w % lauric acid.

The acid etching bath was maintained at temperature in the range from 108° F. to 110° F. in a conventional plate etching machine manufactured by Tasopé Company, Aurora, Mo.

Most of the magnesium metal sheet was dissolved away from the non-imaged areas by the acid etchant. The imaged areas of the resist-protected portions of the magnesium were not affected by the etchant and remained firmly attached to the copolymer layer of the backing structure. The resulting plate was suitable for subsequent use as pattern plate in letterpress printing.

EXAMPLE 2

In this example, a 30-mil sheet of photoengraver's etchable magnesium, a 2-mil film of adhesive copolymer of ethylene and 8 wt. percent acrylic acid, and a 3-mil sheet of poly(ethylene terephthalate) were laminated by assembling the materials in superimposed position in the order recited and subjecting the assembly to heat and pressure sufficient to activate the intermediate adhesive copolymer film and effect bonding thereof to the adjacent surfaces of the metal and poly(ethylene terephthalate) sheets. The starting magnesium sheet was composed of PE magnesium alloy with approximately 3 wt. percent aluminum and 1 wt. percent zinc. Before lamination, the starting magnesium sheet had been acid-pickled to remove mill scale, using the glycolic acid, nitric acid aqueous solution described in Example 1, water-washed and dried. One surface of the starting ethylene copolymer film and one surface of the starting poly(ethylene terephthalate) sheet had been treated with electrostatic corona discharge, and the treated surfaces were arranged to face each other in the laminated structure. The exposed magnesium sheet surface of the resulting laminate was treated with aqueous surface conversion treating composition as described in U.S. Pat. Nos. 3,784,417 and 3,852,125. The so-treated magnesium alloy surface of the laminated plate was then coated with photosensitive acid-resist material, and the plate was exposed to light, developed in hot trichloroethylene and etched, all in conventional manner as described in Example 1, forming a relief etched, photoengraved pattern plate.

The metal in approximately 80% of the larger sized non-image areas of the plate surface was dissolved away by the etchant, cleanly removing such metal down to the surface of the ethylene copolymer layer. The imaged (resist-covered) portions of the plate remained securely anchored to the base structure in exact relative positions. The resulting pattern plate was dimensionally stable and suited for subsequent use in letterpress printing. When used to prepare a series of stereotype mats in conventional manner using heavy pressure, the pattern plate held its shape and did not compress, stretch or distort during such repeated use.

In place of magnesium in the foregoing examples there can be used etchable zinc and other etchable metals and alloys to fabricate composite photoengraved pattern plates with comparable results. The etchable metal layer can be thinner than the 30-mil layers used in the examples when less than 30-mil maximum etching depth is desired or acceptable and can be thicker than 30 mils when desired, e.g. to enable etching to greater etch depth.

What is claimed is:

1. A composite laminated pattern plate having an etchable sheet of magnesium having unetched thickness of approximately 30 mils bonded to a self-supporting, dimensionally stable, all-plastic base structure composed of an intermediate layer of adhesive copolymer of ethylene and acrylic acid, which intermediate layer has substantially uniform thickness in the approximate range from 0.5 to 2 mils, and a backing sheet of poly(ethylene terephthalate) having substantially uniform thickness in the approximate range from 2 to 5 mils.

* * * * *